T. Crane,
Rotary Pump,
N° 14,599. Patented Apr. 8, 1856.
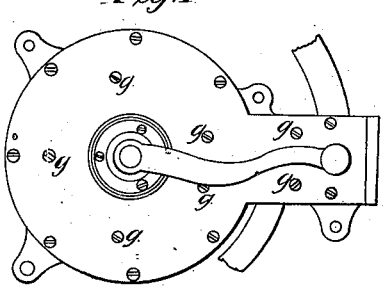
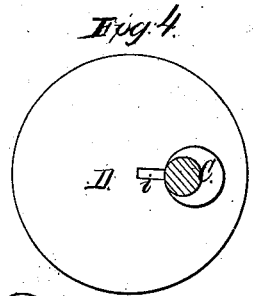
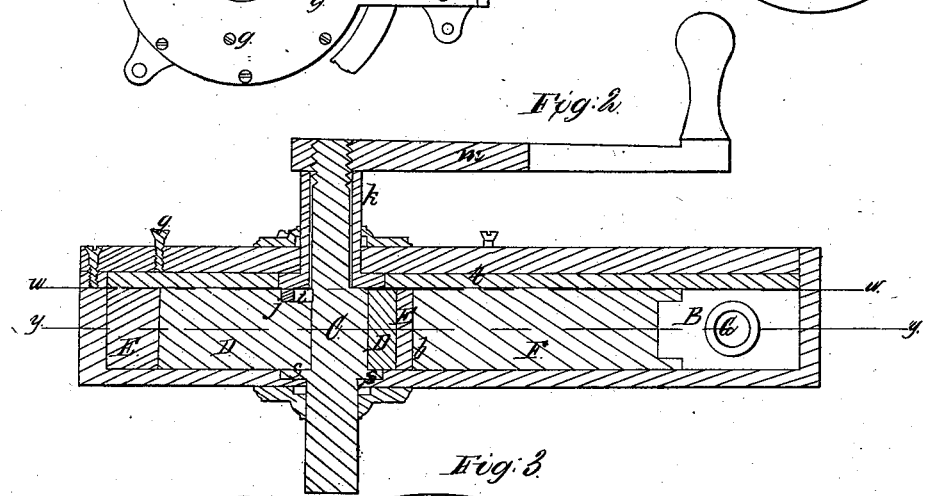
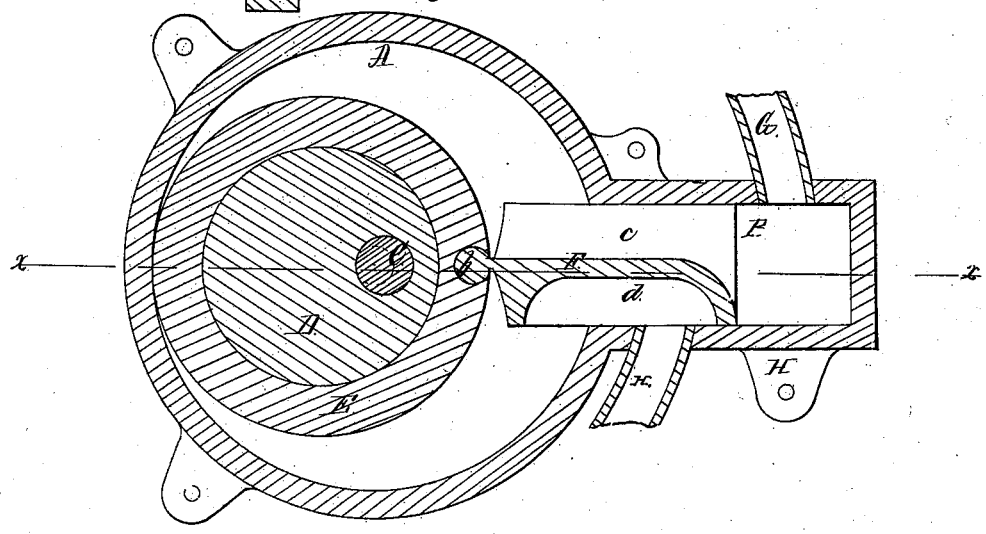

UNITED STATES PATENT OFFICE.

THOMAS CRANE, OF FORT ATKINSON, WISCONSIN.

ROTARY PUMP.

Specification of Letters Patent No. 14,599, dated April 8, 1856.

*To all whom it may concern:*

Be it known that I, THOMAS CRANE, of Fort Atkinson, in the county of Jefferson and State of Wisconsin, have invented a new and useful Improvement in Rotary Pumps; and I do hereby declare that the following is a full and exact description thereof, reference being had to the accompanying drawings, making a part of this specification, Figure 1 being a front view of my improved rotary pump; Fig. 2, a section in the line $x\ x$ of Fig. 3; Fig. 3, a section in the line $y\ y$ of Fig. 2; and Fig. 4 a plan and section of detached portions of the pump, the portion shown as sectional lined in part being cut in the line $w\ w$ of Fig. 2.

My improvement in rotary pumps, consists in an arrangement by which the annular piston E, may, at any moment, without opening the pump, be so adjusted as to cause the rubbing portion of the periphery of the said annular piston to bear closely against the inner periphery of the pump chamber A. This is effected by giving the portion of the shaft C, which passes through the hub D, an eccentric shape, and connecting said shaft to the hub D, by means of a flanched sleeve $k$, on said shaft, whose flanch is within the pump and bears against the hub D, and the shoulder formed by the eccentric portion of said shaft, and which is connected to the hub D, by means of its tooth $j$, that is received into the radial slot $i$, in said hub, as shown in Fig. 2 the sleeve $k$, can be immovably secured to the shaft C, by turning forward the crank $m$, or its equivalent, on the screw portion of said shaft, until the sleeve is compressed between said crank and the shoulder of the eccentric on the shaft, with sufficient force to prevent the shaft from turning within said sleeve. When the periphery of the piston E, becomes worn, or from any other cause it shall be found to work too loosely within the chamber of the pump, it may be tightened by simply unscrewing the crank $m$, and then turning the shaft C, within its sleeve $k$, until the eccentric portion of the shaft shall throw outward the piston a sufficient distance to bring its periphery into close contact with the periphery of the pump chamber; then by screwing down the crank again so as to firmly embrace the sleeve $k$, between it and the shoulder formed by the eccentric portion of the shaft, the piston will be securely held in that position upon its shaft until its periphery shall again be reduced by friction. This same effect may be produced by continuing the shaft C, of the same uniform size, as that embraced by the sleeve $k$, all the way to the flanch $s$, upon said shaft, and inclosing the whole of said portion of the shaft within an elongated sleeve which has an eccentric or cam-shaped projection upon that portion of its periphery which is inclosed within the hub D. By turning the said sleeve the periphery of the annular piston E, would be forced outward; and the said sleeve could be firmly secured in any desired position, by tightly compressing it between the crank $m$, or its equivalent, and the flanch $s$, on the shaft C.

To prevent leakage at the ends of the piston E, I insert within the pump a follower $t$, which accurately fits the shape of the chamber of the pump; and in connection therewith, I also employ a series of set screws $g$, $g$, which pass through the face of the pump and bear against said follower. Consequently, the said follower can always be kept in close contact with the front end of the piston, and the opposite end of the piston be kept in close contact with the rear side of the pump chamber by simply turning the said set screws.

Having thus fully described my improvement in rotary pumps, what I claim therein as my invention and desire to secure by Letters Patent, is—

Connecting the shaft C, to the hub D, in such a manner that, without opening the pump case, the periphery of the annular piston E, can at any moment be forced outward into close contact with the periphery of the pump chamber, substantially in the manner herein set forth.

The above specification of my improvement in rotary pumps, signed and witnessed this 22d day of February 1856.

THOMAS CRANE.

Witnesses:
A. RANKIN,
ELLEN TELFER.